US011175370B1

(12) United States Patent
Schiffmiller et al.

(10) Patent No.: US 11,175,370 B1
(45) Date of Patent: Nov. 16, 2021

(54) MULTIPLE LONG BASELINE INTERFEROMETRY GEOLOCATION

(71) Applicant: BAE Systems Information and Electronic Systems Integration Inc., Nashua, NH (US)

(72) Inventors: Richard Schiffmiller, Teaneck, NJ (US); Eleanna Georgiadis, Franklin Square, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 50 days.

(21) Appl. No.: 16/884,516

(22) Filed: May 27, 2020

(51) Int. Cl.
*G01S 3/42* (2006.01)

(52) U.S. Cl.
CPC ...................... *G01S 3/42* (2013.01)

(58) Field of Classification Search
CPC .............. G01S 3/42; G01S 3/48; G01S 3/46
USPC ........................................................ 342/424
See application file for complete search history.

(56) References Cited

U.S. PATENT DOCUMENTS

| | | | | |
|---|---|---|---|---|
| 2005/0007278 A1* | 1/2005 | Anson | .................. | G01S 3/48 342/451 |
| 2006/0087475 A1* | 4/2006 | Struckman | ............... | G01S 5/04 342/451 |
| 2010/0271255 A1* | 10/2010 | McKitterick | ......... | G01S 13/003 342/27 |
| 2011/0054790 A1* | 3/2011 | Kagawa | ............... | G01S 5/0072 701/472 |
| 2011/0133988 A1* | 6/2011 | Fukagawa | ................. | G01S 3/46 342/442 |
| 2018/0306887 A1* | 10/2018 | Robinson | .................. | G01S 3/46 |

* cited by examiner

*Primary Examiner* — Harry K Liu
(74) *Attorney, Agent, or Firm* — Finch & Maloney PLLC (57) ABSTRACT

Techniques are provided for emitter geolocation. A methodology implementing the techniques according to an embodiment includes measuring phase differences between radar signals received at one or more pairs of antennas. The method also includes calculating hypothesized phase differences based on ray tracings from hypothesized emitter locations at a first set of grid points, to the antennas. The method further includes generating scores based on correlations between the measured phase differences and the hypothesized phase differences. The method further includes generating an error ellipse based on candidate grid points associated with scores that are above a threshold. The process may be repeated on a second set of grid points, bounded by the error ellipse, to generate a second set of scores. The grid point, from the second set of grid points, that is associated with the highest of the second set of scores is selected as the estimated emitter geolocation.

20 Claims, 10 Drawing Sheets

MULTIPLE LONG BASELINE INTERFEROMETRY GEOLOCATION

FIELD OF DISCLOSURE

The present disclosure relates to geolocation of ground based emitters, and more particularly, to geolocation of emitters using multiple long baseline interferometry (LBI) antennas and correlation of measured and hypothesized phase differences.

BACKGROUND

Long baseline interferometry (LBI) is a technique that may be used to perform geolocation of stationary targets from a single moving platform. Traditional LBI systems perform geolocation by flying the interferometer for a period of time with changing orientations of the interferometer axis with respect to the emitter. This constrains the possible locations of the emitter that will produce a set of measured phase differences. Typically, the time required to achieve less than a 10 percent error in range and a two degree error in azimuth, is on the order of 30 to 60 seconds, depending on antenna configuration and geometry, speed of flight, changes in orientation of the interferometer axis, and measurement errors. This time can be too long for many applications.

Although the following Detailed Description will proceed with reference being made to illustrative embodiments, many alternatives, modifications, and variations thereof will be apparent to those skilled in the art.

DETAILED DESCRIPTION

Techniques are provided for geolocation of ground based emitters. The geolocation is based on correlation scores calculated from measured and hypothesized phase differences between radar signals received at multiple LBI antennas. In more detail, and according to one such embodiment, a search grid is established over an area in which the emitter is believed to be transmitting and the hypothesized phase differences are calculated based on ray tracings between the LBI antennas and hypothesized emitter locations at each grid point in the search grid. A correlation surface is formed from the scores, and a region surrounding a peak in the correlation surface is selected as a new and refined search grid. The process is repeated on the refined search grid and a new peak is selected as the estimated geolocation of the emitter. As will be appreciated, the disclosed techniques can be used to reduce the time needed to estimate a geolocation of the emitter and provide increased accuracy of that estimate compared to traditional LBI methods.

The disclosed techniques can be implemented, for example, in a computing system or a software product executable or otherwise controllable by such systems, although other embodiments will be apparent. In accordance with an embodiment, a methodology to implement these techniques includes measuring a phase difference between radar signals received at one or more pairs of antennas. The use of multiple antenna pairs helps to decrease ambiguity in the results. The method also includes calculating hypothesized phase differences based on ray tracings from a hypothesized emitter location at each of a first set of grid points to the pairs of antennas. The method further includes generating scores based on correlation between the measured phase difference and the hypothesized phase differences. The method further includes generating an error ellipse based on candidate grid points of the first set of grid points, the candidate grid points of the first set of grid points associated with a subset of the scores, the subset including scores greater than a threshold percentage of a highest of the scores. The process is repeated on a second set of grid points, which are bounded by the error ellipse, to generate a second set of scores. The grid point, from the second set of grid points, that is associated with the highest of the second set of scores, is selected as the estimated emitter geolocation.

It will be appreciated that the techniques described herein may provide improved geolocation capabilities including faster estimation time and increased accuracy compared to existing techniques that rely on a large number of phase measurements obtained over a relatively long period of flight. These techniques may further be implemented in hardware or software or a combination thereof. Additionally, the disclosed techniques lend themselves to multi-threaded processing which can further improve efficiency.

Figure 1:
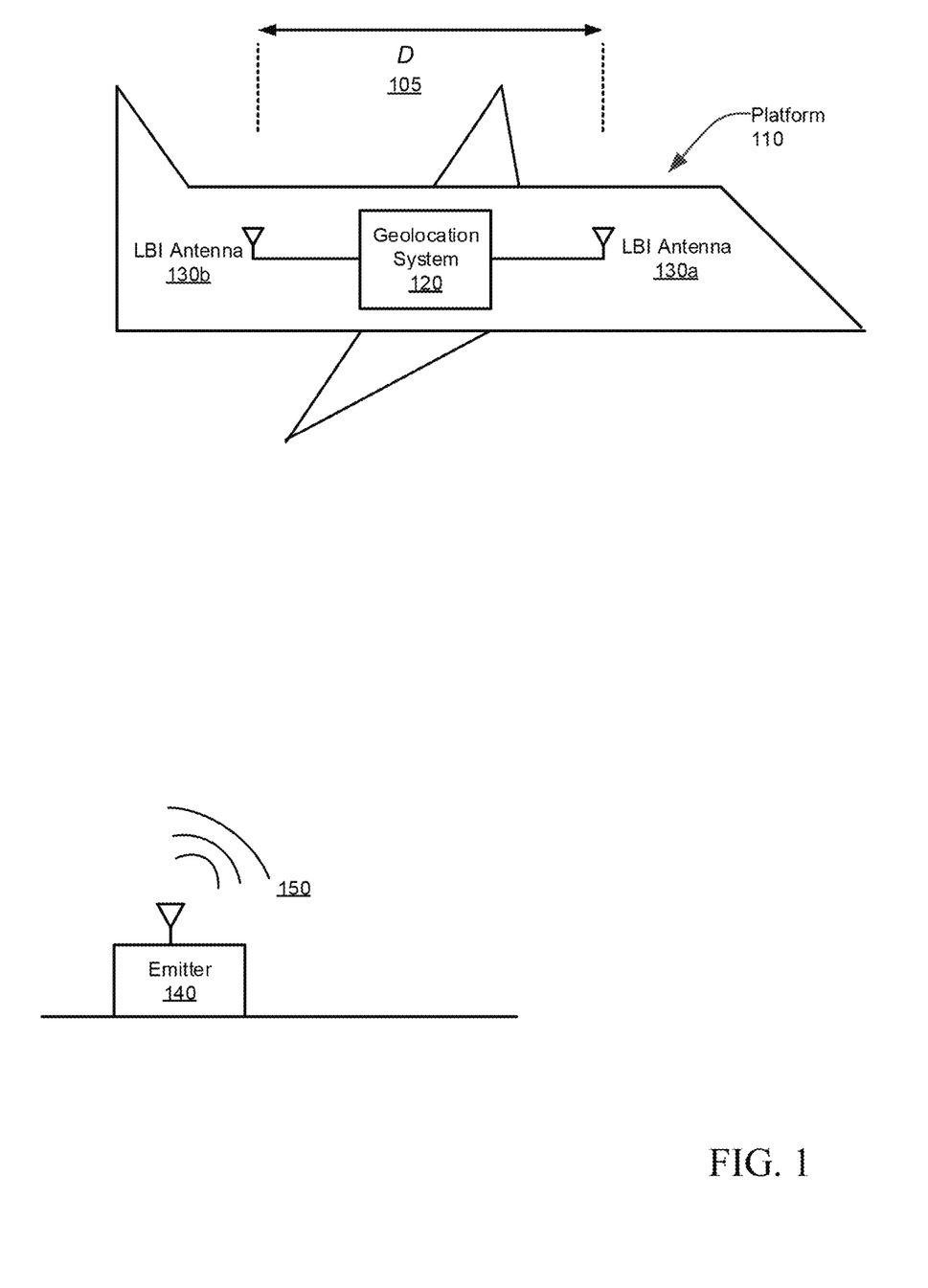
FIG. 1 illustrates a deployment of a geolocation system on an airborne platform, configured in accordance with an embodiment of the present disclosure.

FIG. 1 illustrates a deployment 100 of a geolocation system on an airborne platform 110, such as an aircraft, drone, unmanned aerial vehicle, or projectile, configured in accordance with certain embodiments of the present disclosure. The airborne platform 110, or aircraft, is shown to host a geolocation system 120 coupled to an interferometer comprising two LBI antennas 130a and 130b that are separated by a distance or baseline D. In this example the LBI antennas 130a and 130b are depicted running a longitudinal length along the fuselage of the aircraft however the antennas can also be located with a horizontal orientation or any other suitable orientation. The geolocation system 120 is configured to locate a ground-based radar emitter 140 based on the measured phase differences of the emitted radar signals 150 at the two antennas 130a and 130b, as will be explained in greater detail below. The radar signal may be a pulsed radar signal or a continuous wave (CW) radar signal.

Figure 2:
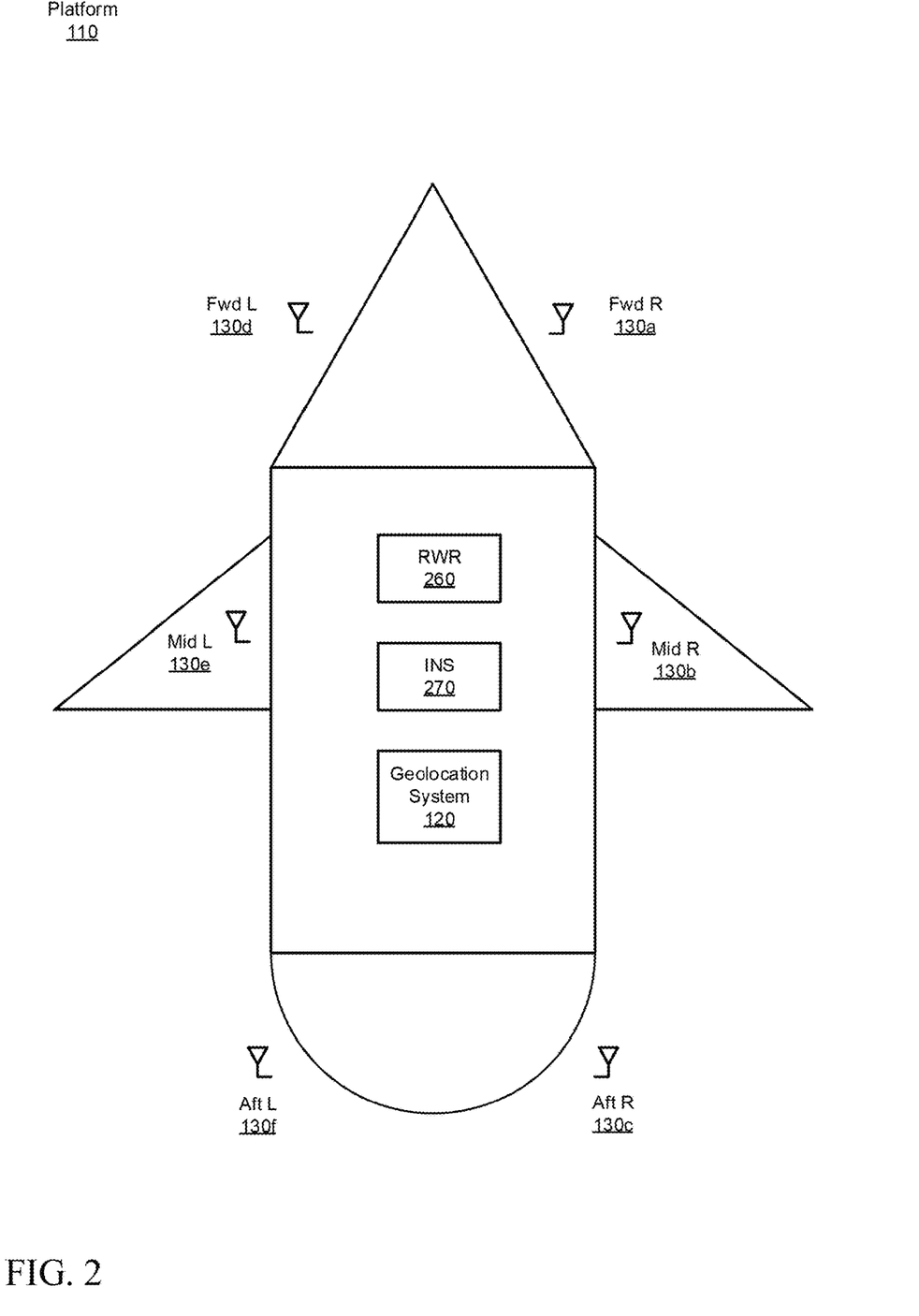
FIG. 2 is a block diagram of the airborne platform including geolocation system and associated components, configured in accordance with an embodiment of the present disclosure.

FIG. 2 is a block diagram of the airborne platform 110 including geolocation system and associated components, configured in accordance with certain embodiments of the present disclosure. In this example, six antennas are shown: forward right 130a, forward left 130d, mid-ship right 130b, mid-ship left 130e, aft right 130c, and aft left 130f. Other configurations are possible depending on the type and size of the platform. Numerous interferometer baselines may be formed out of various pairs of these antennas. For example: 130d-130a, 130a-130b, 130b-130c, 130e-130f, etc. Depending on the orientation of the platform 110 with respect to the emitter 150, two, three or four antennas may simultaneously detect the radar signals from the emitter. In the case of four antennas, three interferometer baselines may be formed. In some embodiments, measured signal to noise ratio may be used to determine which antennas are employed to form interferometers. In general, an increase in the number of usable interferometers will result in an increase in the accuracy of the geolocation and the speed with which the emitter geolocation is achieved. In some embodiments, spacing between antenna pairs of an interferometer may be on the order of 30 to 40 feet depending upon the platform.

Platform 110 is also shown to include a radar warning receiver (RWR) 260, or other suitable digital receiver, and an inertial navigation system (INS) 270. The RWR 260 is configured to collect and buffer raw data samples from the antennas 130 and to provide phase and frequency data associated with the raw data samples (e.g., radar signal segments or pulses 300), for processing by the geolocation system 120. INS 270 is configured to provide platform position and orientation 305, which is used for determining the location of the antennas 130 for use in the ray tracing calculations, as will be described in greater detail below.

Figure 3:
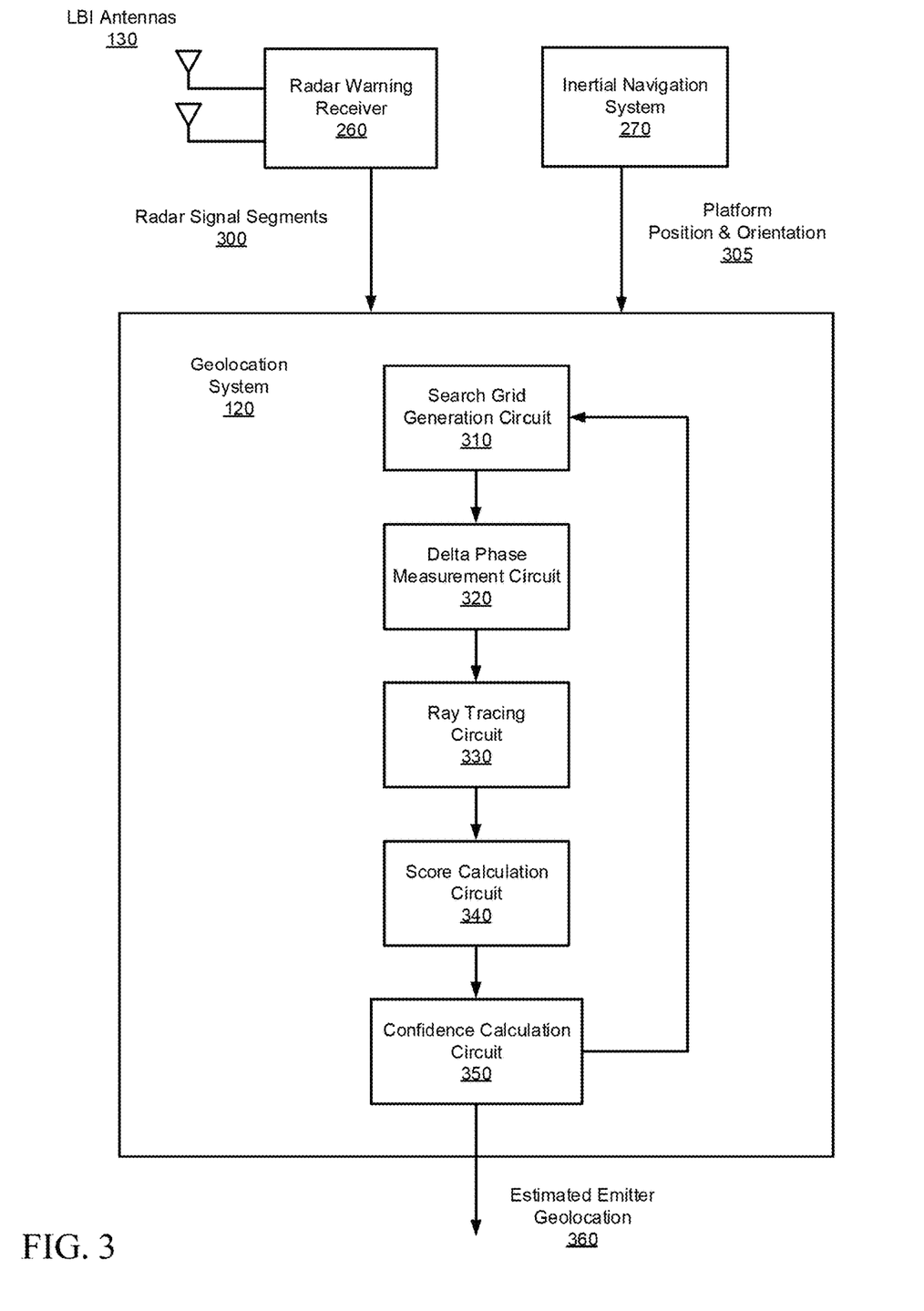
FIG. 3 is a block diagram of the geolocation system, configured in accordance with an embodiment of the present disclosure.

FIG. 3 is a block diagram of the geolocation system 120, configured in accordance with certain embodiments of the present disclosure. The geolocation system 120 is shown to include a search grid generation circuit 310, a delta phase measurement circuit 320, a ray tracing circuit 330, a score calculation circuit 340, and a confidence calculation circuit 350. Radar signals 300 are provided to the geolocation system 120 from LBI antennas, and in some embodiments, it is provided through RWR 260. The radar signals may be processed as pulses from a pulsed emitter or as segments of a continuous wave from a CW emitter. INS 270 is also shown to provide platform and orientation data 305 to the geolocation system 120.

Search grid generation circuit 310 is configured to generate a first set of grid points in a search grid (e.g., bounded by a search area) in which the emitter is believed to be transmitting. In some embodiments, the grid points may be specified by latitude and longitude. The search area is based on an estimated angle and range to the emitter which, in some embodiments, may be provided by the RWR 260 based on signal strength and coarse angle of arrival measurements. For example, the swath of search area may cover from one-half to double the estimated range in the radial direction from the aircraft, and the angular extent of the swath may span plus or minus twenty degrees from the coarse angle of arrival measurement. An example of this search grid, labeled "first pass grid" 410 is provided in FIG. 4 and is shown to comprise grid points illustrated by dots. The grid points of the first set of grid points are spaced so that the difference in path lengths between the ray tracings associated with adjacent grid points is less than one wavelength of the radar signal, as will be explained in greater detail below in connection with FIG. 7.

Delta phase measurement circuit 320 is configured to measure phase differences between radar signals received at one or more pairs of antennas using any suitable measurement technique. The measured phase is designated as $\Delta\varphi_{meas}$.

Figure 6:
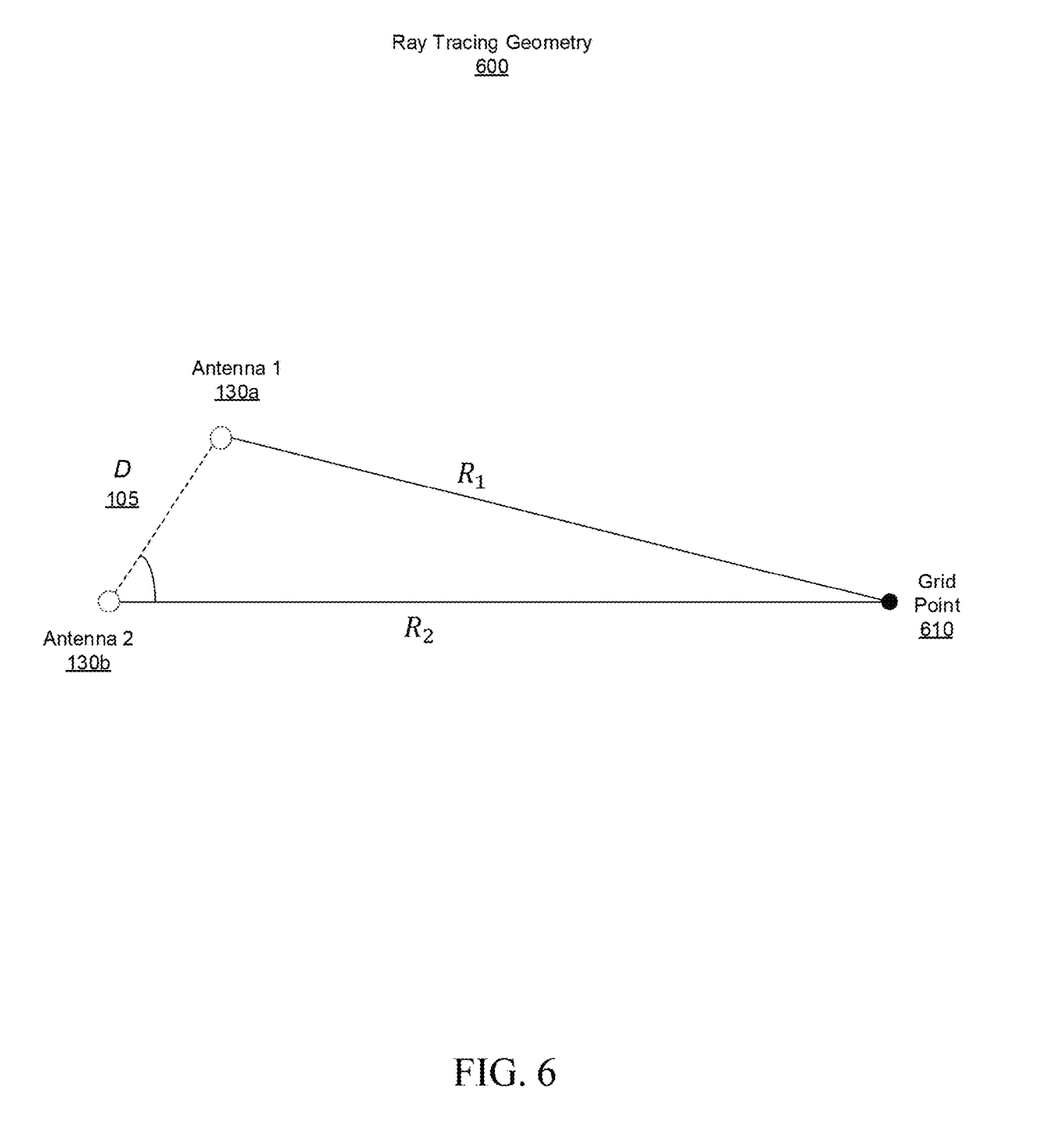
FIG. 6 illustrates ray tracing geometry, in accordance with an embodiment of the present disclosure.

Ray tracing circuit 330 is configured to calculate a first set of hypothesized phase differences based on ray tracings from hypothesized emitter locations at each of the first set of grid points to the one or more pairs of antennas. This is shown in FIG. 6, which illustrates ray tracing geometry 600 for the case of two antennas 130a and 130b and one grid point 610. The locations of the antennas are known, based on data provided by INS 270 specifying the position and orientation 305 of the platform, combined with the known layout of the antenna installations on the platform. The locations of the grid points are also known since they are created by search grid generation circuit 310, as described above. Therefore, rays $R_1$ and $R_2$ can be drawn from each antenna to each grid point 610 and a path length can be calculated for each ray. A hypothesized phase difference can then be calculated from the difference in path lengths of the rays, for example, using the following formula:

$$\Delta\varphi_{hyp} = \left(\frac{2\pi}{\lambda}\right)(R_1 - R_2)$$

where $\lambda$ is the wavelength of the radar signal. This provides an unwrapped phase which may then be converted into a wrapped phase by taking the modulo $2\pi$ radians of the unwrapped phase. This allows for proper comparison with the measured phase, which is a wrapped phase.

Thus, if the emitter happened to be located at one of the grid points, then the measured phase would be substantially equal to the hypothesized phase computed for that grid point (disregarding measurement errors and the like).

The use of ray tracing offers an advantage over traditional methods which rely on an assumption that the wavefront impinging on the interferometer is planar. In actuality, for frequencies of interest at near-field distances (typically less than 20 nautical miles), the emitted spherical electromagnetic wave of the radar signal is not sufficiently planar and can introduce an error in the phase calculation of several degrees. The use of ray tracing to compute the hypothesized phases does not introduce an error at any range, since no assumption is made as to the curvature of the wavefront.

Figure 8:
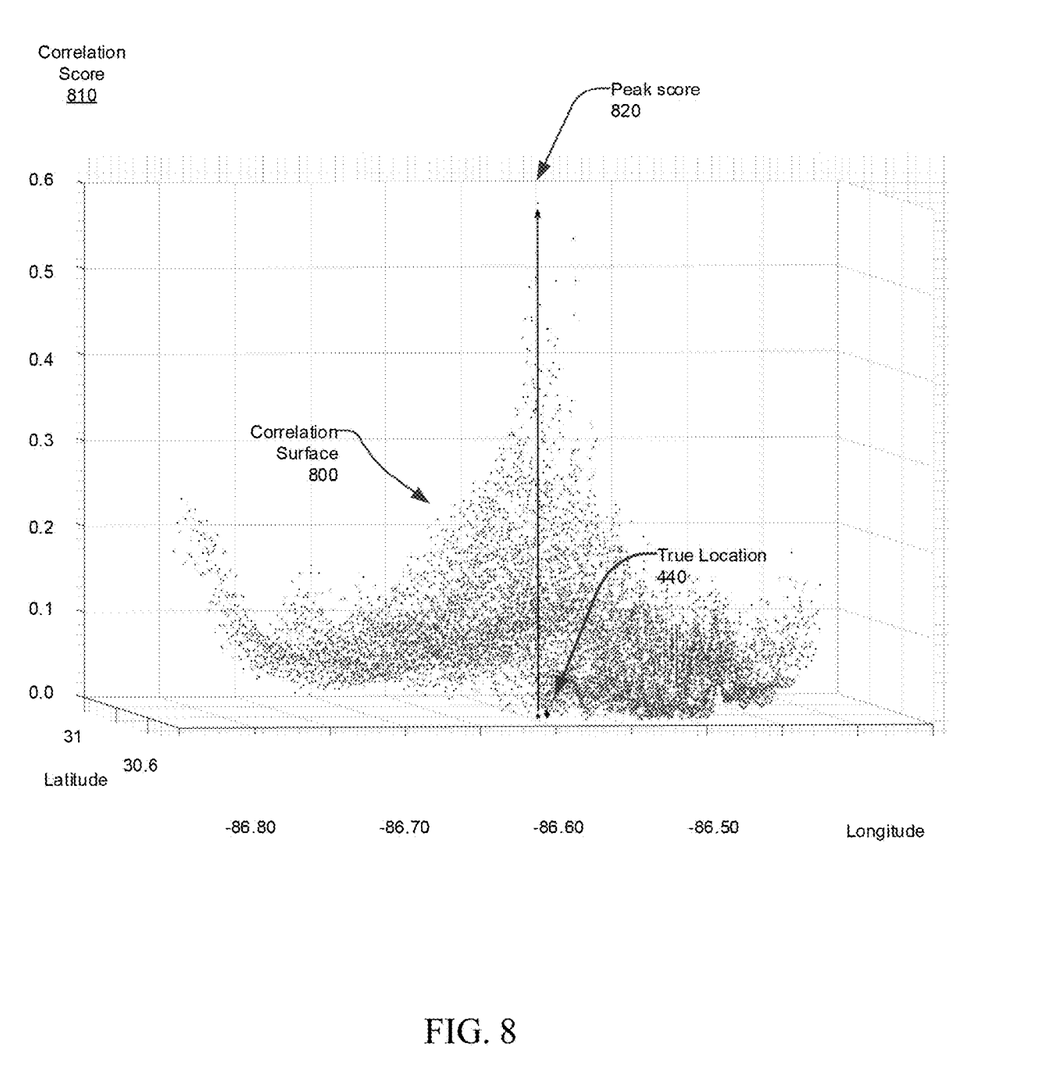
FIG. 8 illustrates a correlation surface of scores, in accordance with an embodiment of the present disclosure.

Score calculation circuit 340 is configured to generate a first set of scores based on correlations between the measured phase differences and the first set of hypothesized phase differences. A score is calculated for the radar signals received at a given interferometer, for a given grid point. The score may be calculated as the sum of the magnitudes of $e^{j\Delta\varphi_{meas}}e^{j\Delta\varphi_{hyp}}$ normalized by the number of phase differences. This normalized sum is referred to as $g_k$, where k is an index for the $k^{th}$ interferometer. The sum over all interferometers (e.g., pairs on antennas) of the magnitudes of each $g_k$ score is computed and normalized by dividing by the number of interferometers and is referred to as f. A correlation score f is calculated for every grid point. A 3-dimensional correlation surface 800 of scores f is illustrated in FIG. 8.

Confidence calculation circuit 350 is configured to generate an error ellipse based on candidate grid points of the first set of grid points. The candidate grid points are those points that are associated with a subset of the first set of scores that include scores greater than a threshold percentage of a highest score. In some embodiments, the threshold may be selected heuristically or experimentally, and may be on the order of 90 percent. The two-dimensional northing and easting coordinates of each candidate grid point are calculated. A covariance matrix is created using the following equation, where $x_i$ and $y_i$ are the two-dimensional coordinates of the $i^{th}$ candidate grid point:

$$\text{covariance} = \begin{bmatrix} \sum_i \frac{(x_i - \bar{x})^2}{N} & \sum_i \frac{(x_i - \bar{x})(y_i - \bar{y})}{N} \\ \sum_i \frac{(x_i - \bar{x})(y_i - \bar{y})}{N} & \sum_i \frac{(y_i - \bar{y})^2}{N} \end{bmatrix}$$

where N is the number of candidate grid points, and $\bar{x}$ and $\bar{y}$ are the means of the x and y candidate grid point coordinates, respectively.

Figure 4:
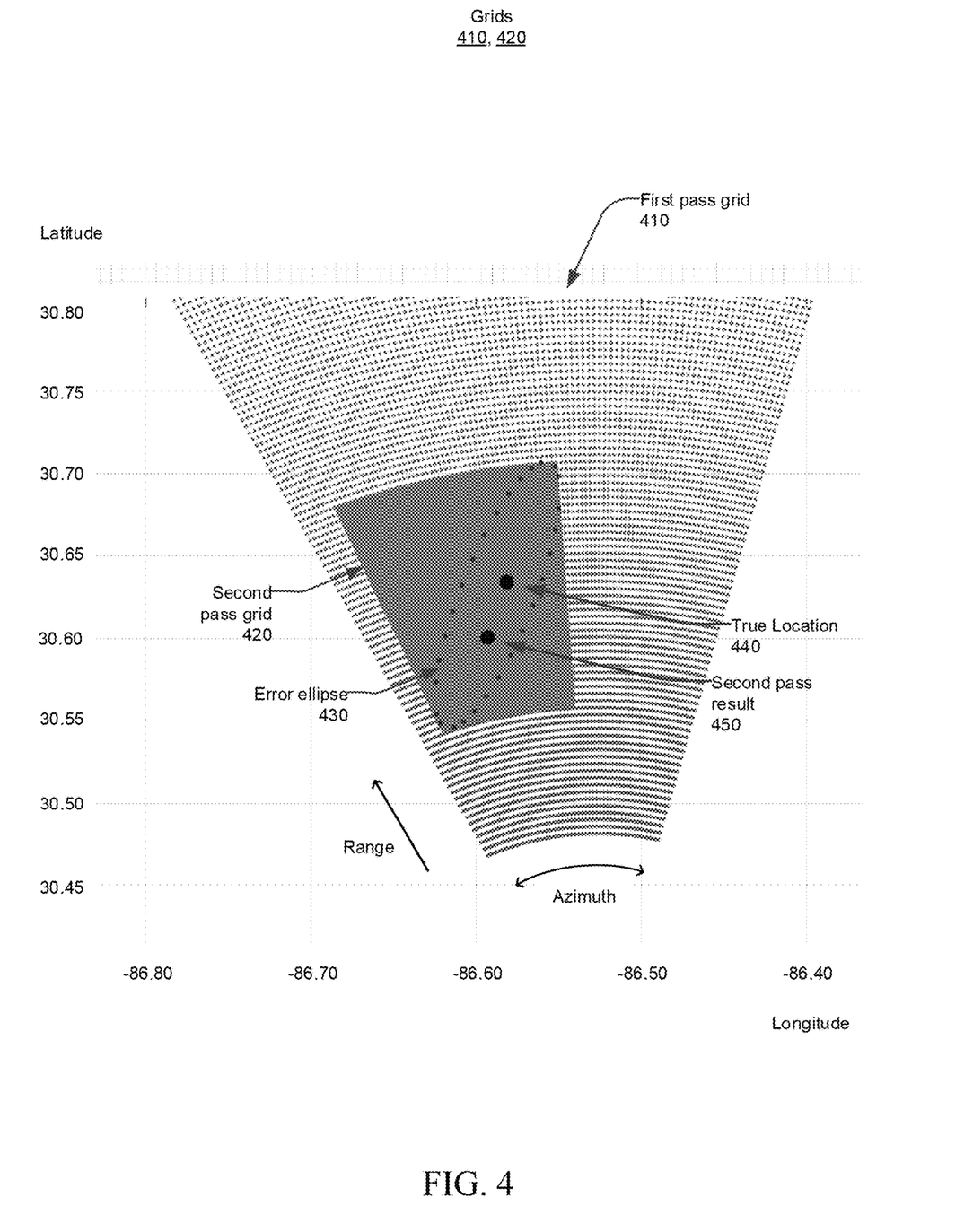
FIG. 4 illustrates grid patterns of hypothesized emitter geolocations, in accordance with an embodiment of the present disclosure.

The covariance matrix may be converted into a two-dimensional error ellipse (see, for example, 430 of FIG. 4) based on the eigenvalues and eigenfunctions of the matrix. If the size of the ellipse is less than a threshold value, the center may be reported as the estimate of the emitter location, along with the covariance matrix as a confidence indicator. Otherwise, the bounds of the error ellipse are used as the limits for a new grid, which is typically smaller than the original grid, and a second pass of processing is performed on the new grid. An example of this new search grid, labeled "second pass grid" 420 is also shown in FIG. 4.

For the second pass, the ray tracing circuit 330 is configured to calculate a second set of hypothesized phase differences based on ray tracings from hypothesized emitter locations at each of a second set of grid points to the one or more pairs of antennas, as described previously for the first pass. The grid points of the second set of grid points are typically spaced closer together than the grid points of the first set of grid points.

The score calculation circuit 340 is further configured to generate a second set of scores based on correlations between the measured phase differences and the second set of hypothesized phase differences, as described previously for the first pass.

The confidence calculation circuit 350 is further configured to generate a second covariance matrix based on coordinates of candidate grid points of the second set of grid points. The confidence calculation circuit 350 is further configured to generate a confidence value based on a size of the second covariance matrix. The confidence calculation circuit 350 is further configured to select one of the second set of grid points that is associated with a highest of the second set of scores, as the estimated emitter geolocation. This second pass result is shown as 450 in FIG. 4 alongside the true emitter location 440. Although additional passes (e.g., a third pass, fourth pass, etc.) are possible, in general, two passes are sufficient, with additional passes providing little or no improvement in geolocation accuracy.

Figure 5:
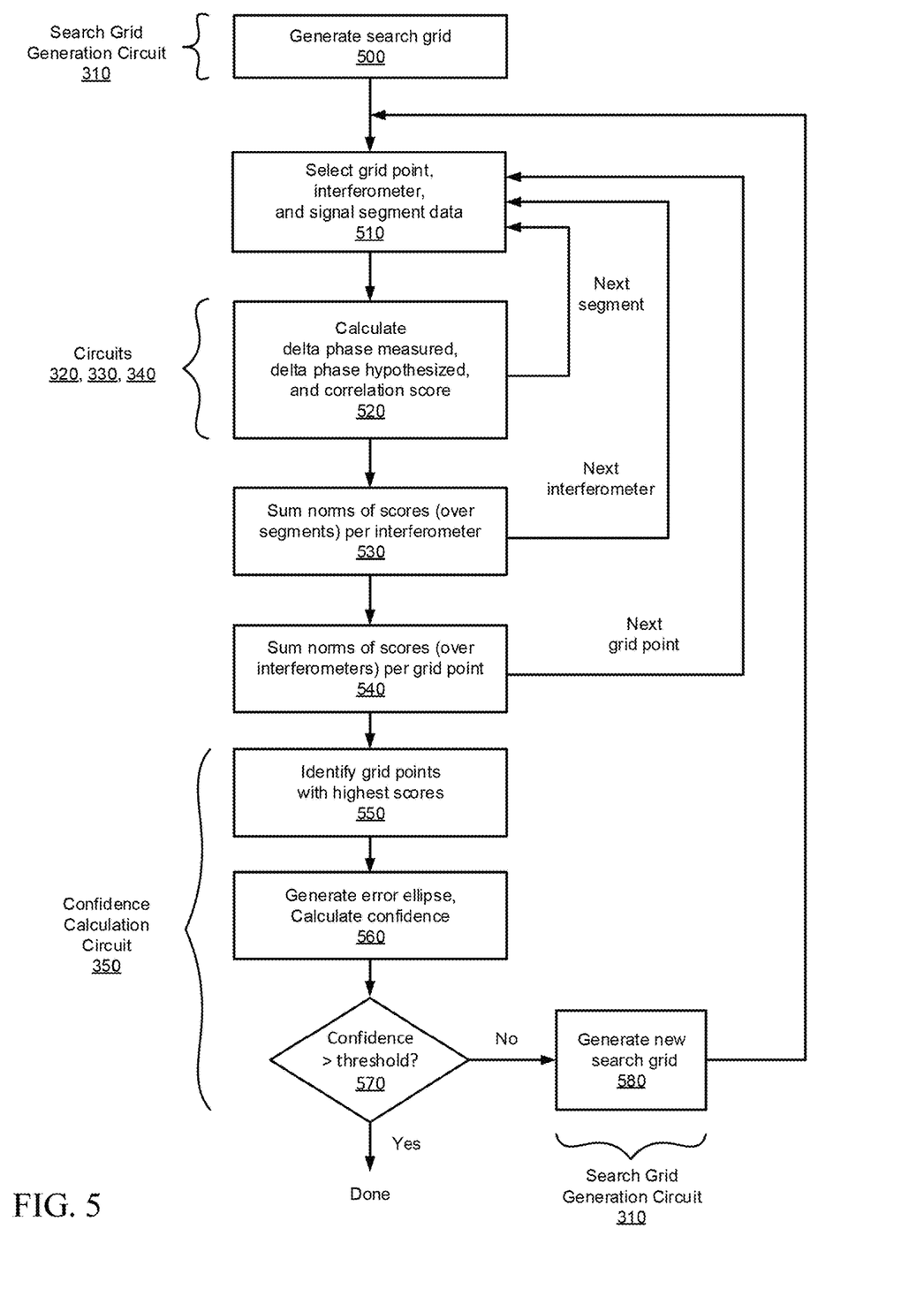
FIG. 5 is a flowchart illustrating operation of the geolocation system, configured in accordance with an embodiment of the present disclosure.

FIG. 5 is a flowchart illustrating operation of the geolocation system, configured in accordance with certain embodiments of the present disclosure. Prior to operation, an initialization is performed in which the antenna and interferometer configuration is established (e.g., locations of antennas are noted and pairings of antennas into interferometers are determined). Additionally, measured sensor data (radar signal phase and frequency, and INS data) is collected and stored.

At operation 500, a first pass search grid is generated. The grid points are bounded by a search area in which the emitter is believed to be transmitting. The search area is based on an estimated angle and range to the emitter, derived from any suitable source.

The process then proceeds with three nested loops. The innermost loop is performed for each radar pulse or segment, the next outer loop is performed for each interferometer (e.g., antenna pair), and the outermost loop is performed for each grid point. Thus, at operation 510, a grid point is selected, an interferometer (antenna pair) is selected, and a radar pulse or segment is selected.

At operation 520, a measured delta phase is determined for the radar signal received at the two antennas of the current interferometer. A hypothesized delta phase is also calculated based on ray tracing from the current interferometer to the current grid point. A correlation score is calculated based on the measured and hypothesized delta phases, and the process loops back to operation 510 for the next radar pulse or segment.

At operation 530, after all radar signals have been processed for the current interferometer, a normalized score (g) is computed as the sum of the scores over all radar pulses/segments divided by the number of radar pulses/segments. The process then loops back to operation 510 for the next interferometer (e.g., the next pair of antennas).

At operation 540, after all interferometers have been processed for the current grid point, a normalized score (f) is computed as the sum of the g scores over all interferometers divided by the number of interferometers. The process then loops back to operation 510 for the next grid point.

At operation 550, after all grid points have been processed, candidate grid points associated with the highest scores (f) are identified. In some embodiments, these may include all scores that are within a threshold percentage of the highest score.

At operation 560, an error ellipse is generated, based on the candidate scores, and a confidence value is calculated, as previously described.

At operation 570, if the confidence exceeds a threshold value, then the grid point with the highest score is selected as the estimated emitter location. Otherwise, at operation 580, a new search grid is generated, bounded by the error ellipse, and the process repeats, at operation 510.

If, after the second pass with the new search grid, the confidence value still fails to exceed the desired threshold, and if a processing timer has not yet expired, additional radar signal data may be collected and appended to the existing data, and the process repeated to generate a new geolocation estimate. In some embodiments, the expiration of time may be based on communication with a threat warning system which may provide an indication that an incoming missile or other threat is imminent, and thus no further time may be spent refining the geolocation estimate.

Figure 7:
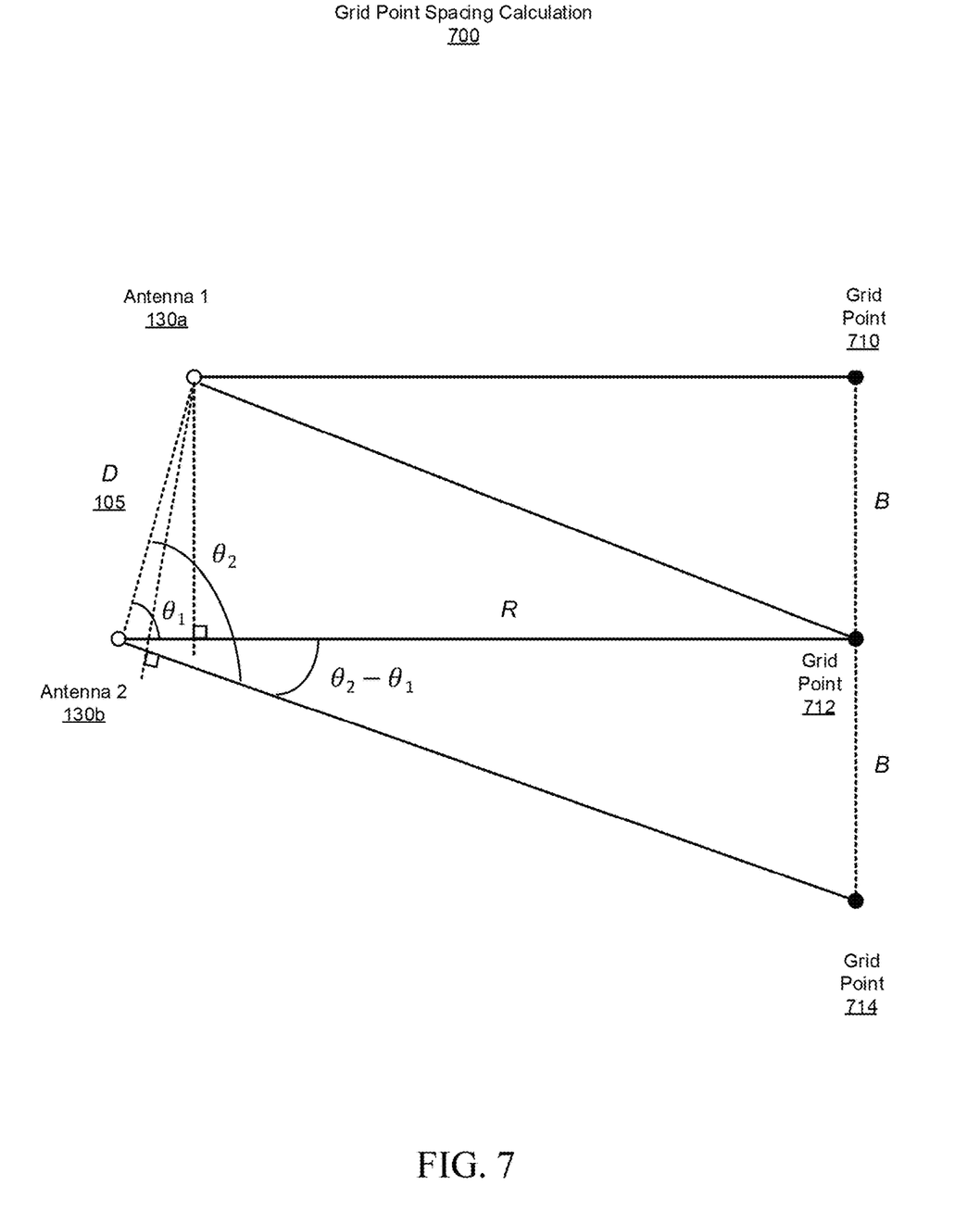
FIG. 7 illustrates grid point spacing calculation, in accordance with an embodiment of the present disclosure.

FIG. 7 illustrates grid point spacing calculation 700, in accordance with certain embodiments of the present disclosure. Three adjacent grid points 710, 712, and 714, are shown to be spaced at a distance B. The antennas are located at an approximate distance R from the grid points, where R is much greater than D, the distance between the antennas 130a and 130b.

As previously explained, the grid points, in both the first search grid and the second search grid, should be spaced at distance B such that the difference in path lengths between the ray tracings associated with adjacent grid points is less than one wavelength $\lambda$ of the radar signal. This distance B can be determined according to the following equation:

$$B \cong R\left(a\cos\left(\cos(\theta_1) - \frac{\lambda}{D}\right) - \theta_1\right)$$

where $\theta_1$ is the orientation angle of the interferometer relative to a grid point, as shown in FIG. 7. This equation can be derived from the requirement that $D\cos(\theta_1) - D\cos(\theta_2) \leq \lambda$, where $\theta_2$ is the orientation angle of the interferometer relative to the adjacent grid point. From this it follows that $$\theta_2 \cong a\cos\left(\cos(\theta_1) - \frac{\lambda}{D}\right),$$

and $B \cong R(\theta_2 - \theta_1)$.

FIG. 8 illustrates a correlation surface 800 of scores, in accordance with certain embodiments of the present disclosure. The correlation surface (for the first pass or the second pass) is made up of the computed correlation scores 810 (for the first pass or the second pass, respectively), as a function of latitude and longitude. The peak score 820 is shown to lie relatively close to the true emitter location 440.

Methodology

Figure 9:
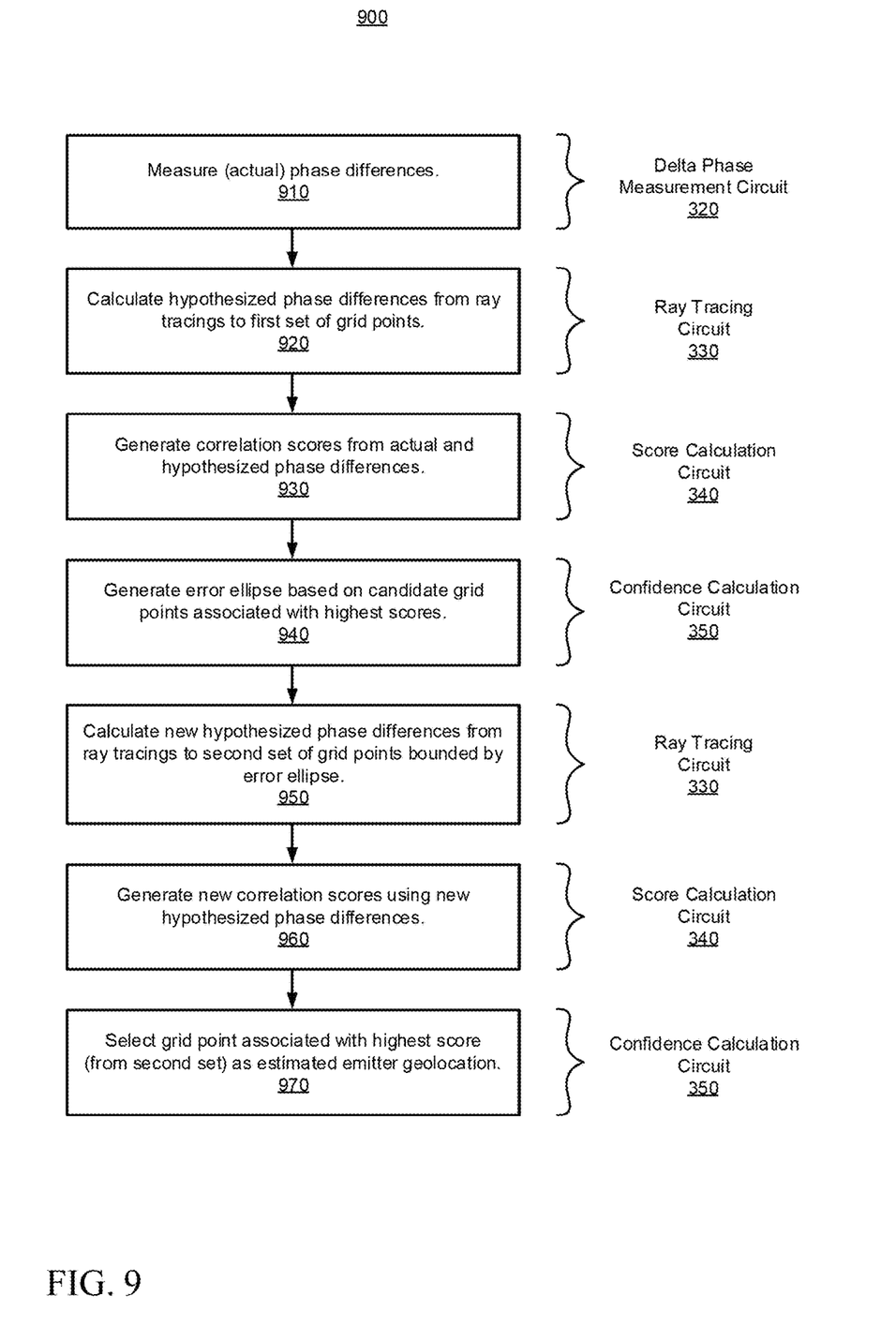
FIG. 9 is a flowchart illustrating a methodology for emitter geolocation, in accordance with an embodiment of the present disclosure.

FIG. 9 is a flowchart illustrating a methodology for emitter geolocation, in accordance with certain other embodiments of the present disclosure. As can be seen, example method 900 includes a number of phases and sub-processes, the sequence of which may vary from one embodiment to another. However, when considered in the aggregate, these phases and sub-processes form a process for geolocation of ground based emitters, in accordance with certain of the embodiments disclosed herein. These embodiments can be implemented, for example using the system architecture illustrated in FIGS. 1-3, and 5, as described above. However other system architectures can be used in other embodiments, as will be apparent in light of this disclosure. To this end, the correlation of the various functions shown in FIG. 9 to the specific components illustrated in FIGS. 1-3, and 5, is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 9, in one embodiment method 900 commences, at operation 910, by measuring phase differences between radar signals received at pairs of antennas of one or more interferometers. The radar signals are transmitted from the ground-based emitter.

Next, at operation 920, hypothesized phase differences are calculated based on ray tracings from hypothesized emitter locations at each of a first set of grid points to the one or more pairs of antennas. The first set of grid points is bounded by a search area that may be based on an estimated angle and range of the emitter. In some embodiments, the estimate may be provided by a radar warning receiver. The spacing between the grid points of the first set of grid points is selected so that a difference in path length between the ray tracings associated with adjacent grid points is less than one wavelength of the radar signal.

At operation 930, a first set of scores is generated based on correlations between the measured phase differences and the hypothesized phase differences.

At operation 940, an error ellipse is generated based on candidate grid points of the first set of grid points. The candidate grid points are associated with a subset of the first set of scores, the subset including scores greater than a threshold percentage of the highest of the scores. The generation of the error ellipse further comprises calculating a covariance matrix based on coordinates of the candidate grid points.

At operation 950, new hypothesized phase differences are generated based on ray tracings from hypothesized emitter locations at each of a second set of grid points to the one or more pairs of antennas. The area of the second set of grid points is bounded by the error ellipse and is subdivided by the same number of grid points as in the first search area grid. Therefore the spacing between the grid points of the second set of grid points is generally less than the spacing between the grid points of the first set of grid points since the error ellipse is typically a smaller region located within the first set of grid points, potentially providing a greater geolocation accuracy.

At operation 960, a second set of scores is generated based on correlations between the measured phase differences and the new hypothesized phase differences.

At operation 970, one of the second set of grid points, that is associated with a highest of the second set of scores, is selected as the estimated emitter geolocation. A confidence value may be associated with the estimated emitter geolocation, based on a size of a second covariance matrix calculated from points of the second set of grid points that are associated with scores greater than a threshold percentage of the highest of the second set of scores.

Of course, in some embodiments, additional operations may be performed, as previously described in connection with the system. These additional operations may include, for example, repeating the process using additional measured phase differences if the confidence value is less than a threshold confidence value. The process may be repeated until a process timer exceeds a duration threshold. In some embodiments, the process may be performed as a multi-threaded process comprising a first thread to perform the process to geolocate a first emitter, a second thread to perform the process to geolocate a second emitter, and so forth. In some embodiments, the threads may be executed on multiple processors.

Example Platforms

Figure 10:
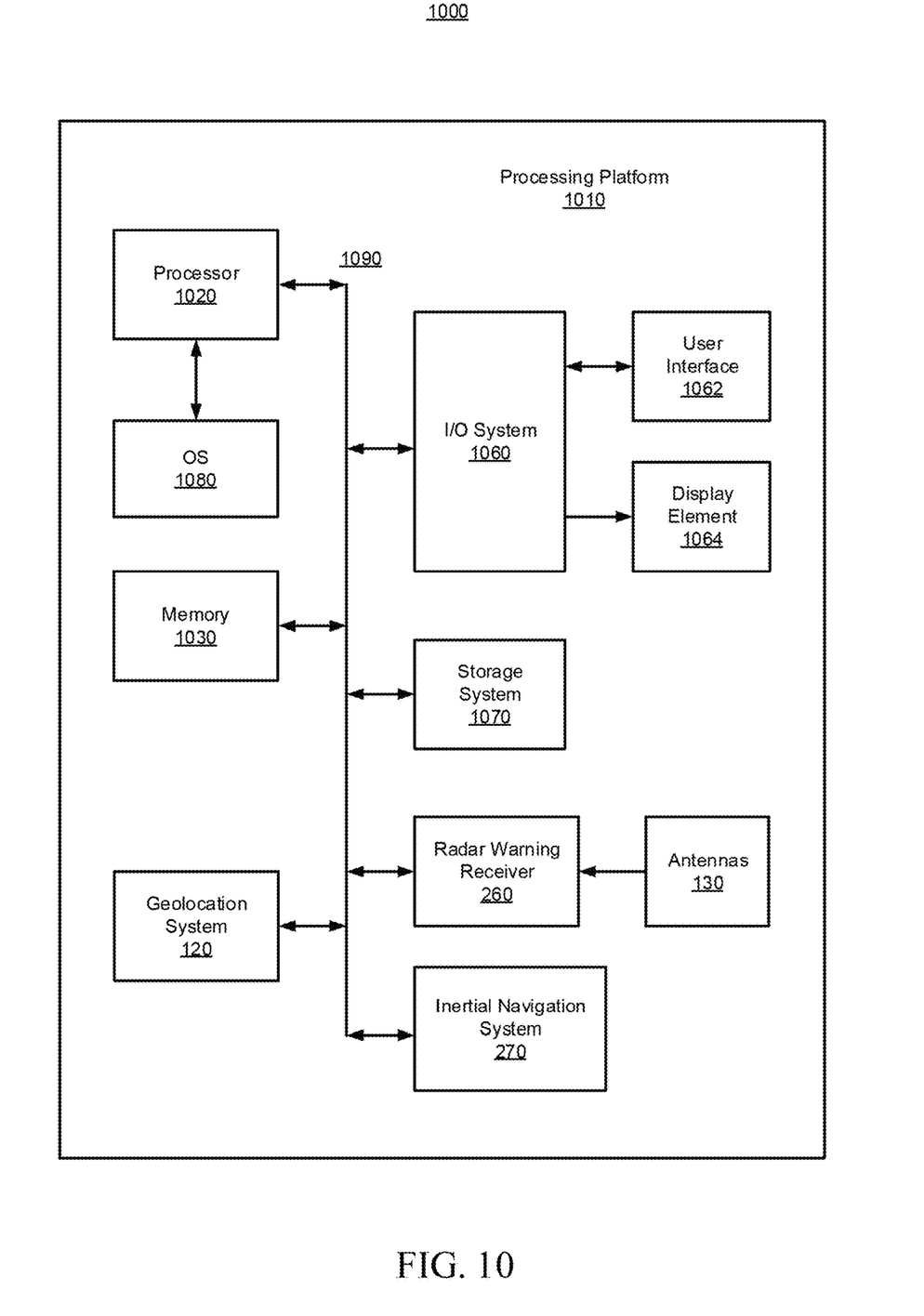
FIG. 10 is a block diagram schematically illustrating a platform employing the disclosed geolocation system, in accordance with certain embodiments of the present disclosure.

FIG. 10 is a block diagram 1000 schematically illustrating a processing platform 1010 employing the disclosed geolocation system, in accordance with certain embodiments of the present disclosure. In some embodiments, platform 1010, or portions thereof, may be hosted on, or otherwise be incorporated into an aircraft, the electronic systems of the aircraft, a ground station, or any other suitable platform.

In some embodiments, platform 1010 may comprise any combination of a processor 1020, a memory 1030, an input/output (I/O) system 1060, a user interface 1062, a display element 1064, a storage system 1070, geolocation system 120, radar warning receiver 260, antennas (including interferometer antennas), and inertial navigation system 270. As can be further seen, a bus and/or interconnect 1090 is also provided to allow for communication between the various components listed above and/or other components not shown. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor, a graphics processing unit, or hardware accelerator, to assist in control and processing operations associated with platform 1010. In some embodiments, the processor 1020 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor.

Memory 1030 can be implemented using any suitable type of digital storage including, for example, flash memory and/or random access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 1020 may be configured to execute an Operating System (OS) 1080 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 1010, and therefore may also be implemented using any suitable existing or subsequently-developed platform.

I/O system 1060 may be configured to interface between various I/O devices and other components of platform 1010. I/O devices may include, but not be limited to, user interface 1062 and display element 1064. User interface 1062 may include other devices (not shown) such as a touchpad, keyboard, mouse, microphone and speaker, trackball or scratch pad, and camera. I/O system 1060 may include a graphics subsystem configured to perform processing of images for rendering on the display element 1064. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1020 or any chipset of platform 1010.

It will be appreciated that in some embodiments, some of the various components of platform 1010 may be combined or integrated in a system-on-a-chip (SoC) architecture. In some embodiments, the components may be hardware components, firmware components, software components or any suitable combination of hardware, firmware or software.

Geolocation system 120 is configured to perform geolocation of ground based emitters using multiple long baseline interferometry based on measured and hypothesized phase differences, as described previously. Geolocation system 120 may include any or all of the circuits/components illustrated in FIGS. 1-3, and 5, as described above. These components can be implemented or otherwise used in conjunction with a variety of suitable software and/or hardware that is coupled to or that otherwise forms a part of platform 1010. These components can additionally or alternatively be implemented or otherwise used in conjunction with user I/O devices that are capable of providing information to, and receiving information and commands from, a user.

In one example, the emitter location is detected and communicated to a pilot or base station so that evasive maneuvers can be conducted to avoid or minimize detection by the emitter. Other measures may include using the emitter location for jamming, signal intelligence, spoofing or other countermeasure techniques. The emitter location can also be targeted for destruction.

Various embodiments of platform 1010 may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, causes one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments platform 1010 may comprise additional, fewer, or alternative subcomponents as compared to those included in the example embodiment of FIG. 10.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a system for emitter geolocation, the system comprising: a delta phase measurement circuit to measure a phase difference between radar signals received at a pair of antennas; a ray tracing circuit to calculate hypothesized phase differences based on ray tracings from a hypothesized emitter location at each of a first set of grid points to the pair of antennas; a score calculation circuit to generate scores based on correlation between the measured phase difference and the hypothesized phase differences; a confidence calculation circuit to generate an error ellipse based on candidate grid points of the first set of grid points, the candidate grid points of the first set of grid points associated with a subset of the scores, the subset including scores greater than a threshold percentage of a highest of the scores; the ray tracing circuit further to repeat the calculation of hypothesized phase differences using a second set of grid points bounded by the error ellipse; the score calculation circuit further to repeat the generation of scores based on the hypothesized phase differences using the second set of grid points; and the confidence calculation circuit further to select one of the second set of grid points as the estimated emitter geolocation, the selected grid point associated with a highest of the scores generated during the repetition of the generation of scores.

In some cases, the system further comprises a search grid generation circuit to generate the first set of grid points bounded by a search area, the search area based on an estimated angle and range to the emitter as provided by a radar warning receiver. In some such cases, the search grid generation circuit is further to space the grid points of the first set of grid points so that a difference in path length between the ray tracings associated with adjacent grid points is less than one wavelength of the radar signal. In some such cases, the search grid generation circuit is further to space the grid points of the second set of grid points as less than the spacing between the grid points of the first set of grid points. In some cases, generating the error ellipse further comprises calculating a covariance matrix based on coordinates of the candidate grid points of the first set of grid points. In some such cases, the covariance matrix is a first covariance matrix and the threshold percentage is a first threshold percentage, and the score calculation circuit is further to: generate a second covariance matrix based on coordinates of candidate grid points of the second set of grid points, the candidate grid points of the second set of grid points associated with a subset of the scores generated during the repetition of the generation of the scores including scores greater than a second threshold percentage of the highest of the scores generated during the repetition of the generation of the scores; and generate a confidence value based on a size of the second covariance matrix.

Another example embodiment of the present disclosure provides a computer program product including one or more machine-readable mediums encoded with instructions that when executed by one or more processors cause a process to be carried out for emitter geolocation, the process comprising: measuring a phase difference between radar signals received at a pair of antennas; calculating hypothesized phase differences based on ray tracings from a hypothesized emitter location at each of a first set of grid points to the pair of antennas; generating scores based on correlation between the measured phase difference and the hypothesized phase differences; generating an error ellipse based on candidate grid points of the first set of grid points, the candidate grid points of the first set of grid points associated with a subset of the scores, the subset including scores greater than a threshold percentage of a highest of the scores; repeating the process of calculating hypothesized phase differences and generating scores using a second set of grid points bounded by the error ellipse; and selecting one of the second set of grid points as the estimated emitter geolocation, the selected grid point associated with a highest of the scores generated during the repetition of the process.

In some cases, the first set of grid points is bounded by a search area, the search area based on an estimated angle and range to the emitter as provided by a radar warning receiver. In some cases, spacing between the grid points of the first set of grid points is selected so that a difference in path length between the ray tracings associated with adjacent grid points is less than one wavelength of the radar signal. In some cases, spacing between the grid points of the second set of grid points is less than spacing between the grid points of the first set of grid points. In some cases, generating the error ellipse further comprises calculating a covariance matrix based on coordinates of the candidate grid points of the first set of grid points. In some such cases, the covariance matrix is a first covariance matrix and the threshold percentage is a first threshold percentage, and the process further comprises: generating a second covariance matrix based on coordinates of candidate grid points of the second set of grid points, the candidate grid points of the second set of grid points associated with a subset of the scores generated during the repetition of the process including scores greater than a second threshold percentage of the highest of the scores generated during the repetition of the process; and generating a confidence value based on a size of the second covariance matrix. In some such cases, the computer program product further comprises repeating the process using additional measured phase differences if the confidence value is less than a threshold confidence value. In some cases, the process is performed as a multi-threaded process comprising a first thread to perform the process to geolocate a first emitter and a second thread to perform the process to geolocate a second emitter.

Another example embodiment of the present disclosure provides a method for emitter geolocation, the method comprising: measuring, by a processor-based system, phase differences between radar signals received at one or more pairs of antennas; calculating, by the processor-based system, a first plurality of hypothesized phase differences based on ray tracings from hypothesized emitter locations at each of a first set of grid points to the one or more pairs of antennas; generating, by the processor-based system, a first plurality of scores based on correlations between the measured phase differences and the first plurality of hypothesized phase differences; generating, by the processor-based system, an error ellipse based on candidate grid points of the first set of grid points, the candidate grid points of the first set of grid points associated with a subset of the first plurality of scores, the subset including scores greater than a threshold percentage of a highest score of the first plurality of scores; calculating, by the processor-based system, a second plurality of hypothesized phase differences based on ray tracings from hypothesized emitter locations at each of a second set of grid points to the one or more pairs of antennas, the second set of grid points bounded by the error ellipse; generating, by the processor-based system, a second plurality of scores based on correlations between the measured phase differences and the second plurality of hypothesized phase differences; and selecting, by the processor-based system, one of the second set of grid points, that is associated with a highest of the second plurality of scores, as the estimated emitter geolocation.

In some cases, the first set of grid points is bounded by a search area, the search area based on an estimated angle and range to the emitter as provided by a radar warning receiver. In some cases, spacing between the grid points of the first set of grid points is selected so that a difference in path length between the ray tracings associated with adjacent grid points is less than one wavelength of the radar signal. In some cases, spacing between the grid points of the second set of grid points is less than spacing between the grid points of the first set of grid points. In some cases, generating the error ellipse further comprises calculating a covariance matrix based on coordinates of the candidate grid points of the first set of grid points. In some such cases, the covariance matrix is a first covariance matrix and the threshold percentage is a first threshold percentage, and the process further comprises: generating a second covariance matrix based on coordinates of candidate grid points of the second set of grid points, the candidate grid points of the second set of grid points associated with a subset of the second plurality of scores, the subset including scores greater than a second threshold percentage of a highest score of the second plurality of scores; generating a confidence value based on a size of the second covariance matrix; and repeating the method using additional measured phase differences if the confidence value is less than a threshold confidence value.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A system for emitter geolocation, the system comprising:
    a delta phase measurement circuit to measure a phase difference between radar signals received at a pair of antennas;
    a ray tracing circuit to calculate hypothesized phase differences based on ray tracings from a hypothesized emitter location at each of a first set of grid points to the pair of antennas;
    a score calculation circuit to generate scores based on correlation between the measured phase difference and the hypothesized phase differences;
    a confidence calculation circuit to generate an error ellipse based on candidate grid points of the first set of grid points, the candidate grid points of the first set of grid points associated with a subset of the scores, the subset including scores greater than a threshold percentage of a highest of the scores;
    the ray tracing circuit further to repeat the calculation of hypothesized phase differences using a second set of grid points bounded by the error ellipse;
    the score calculation circuit further to repeat the generation of scores based on the hypothesized phase differences using the second set of grid points; and
    the confidence calculation circuit further to select one of the second set of grid points as the estimated emitter geolocation, the selected grid point associated with a highest of the scores generated during the repetition of the generation of scores.

2. The system of claim 1, further comprising a search grid generation circuit to generate the first set of grid points bounded by a search area, the search area based on an estimated angle and range to the emitter as provided by a radar warning receiver.

3. The system of claim 2, wherein the search grid generation circuit is further to space the grid points of the first set of grid points so that a difference in path length between the ray tracings associated with adjacent grid points is less than one wavelength of the radar signal.

4. The system of claim 2, wherein the search grid generation circuit is further to space the grid points of the second set of grid points as less than the spacing between the grid points of the first set of grid points.

5. The system of claim 1, wherein generating the error ellipse further comprises calculating a covariance matrix based on coordinates of the candidate grid points of the first set of grid points.

6. The system of claim 5, wherein the covariance matrix is a first covariance matrix and the threshold percentage is a first threshold percentage, and the score calculation circuit is further to:
    generate a second covariance matrix based on coordinates of candidate grid points of the second set of grid points, the candidate grid points of the second set of grid points associated with a subset of the scores generated during the repetition of the generation of the scores including scores greater than a second threshold percentage of the highest of the scores generated during the repetition of the generation of the scores; and
    generate a confidence value based on a size of the second covariance matrix.

7. A computer program product including one or more non-transitory machine-readable mediums encoded with instructions that when executed by one or more processors cause a process to be carried out for emitter geolocation, the process comprising:
    measuring a phase difference between radar signals received at a pair of antennas;
    calculating hypothesized phase differences based on ray tracings from a hypothesized emitter location at each of a first set of grid points to the pair of antennas;
    generating scores based on correlation between the measured phase difference and the hypothesized phase differences;
    generating an error ellipse based on candidate grid points of the first set of grid points, the candidate grid points of the first set of grid points associated with a subset of the scores, the subset including scores greater than a threshold percentage of a highest of the scores;
    repeating the process of calculating hypothesized phase differences and generating scores using a second set of grid points bounded by the error ellipse; and
    selecting one of the second set of grid points as the estimated emitter geolocation, the selected grid point associated with a highest of the scores generated during the repetition of the process.

8. The computer program product of claim 7, wherein the first set of grid points is bounded by a search area, the search area based on an estimated angle and range to the emitter as provided by a radar warning receiver.

9. The computer program product of claim 7, wherein spacing between the grid points of the first set of grid points is selected so that a difference in path length between the ray tracings associated with adjacent grid points is less than one wavelength of the radar signal.

10. The computer program product of claim 7, wherein spacing between the grid points of the second set of grid points is less than spacing between the grid points of the first set of grid points.

11. The computer program product of claim 7, wherein generating the error ellipse further comprises calculating a covariance matrix based on coordinates of the candidate grid points of the first set of grid points.

12. The computer program product of claim 11, wherein the covariance matrix is a first covariance matrix and the threshold percentage is a first threshold percentage, and the process further comprises:

generating a second covariance matrix based on coordinates of candidate grid points of the second set of grid points, the candidate grid points of the second set of grid points associated with a subset of the scores generated during the repetition of the process including scores greater than a second threshold percentage of the highest of the scores generated during the repetition of the process; and generating a confidence value based on a size of the second covariance matrix.

13. The computer program product of claim 12, further comprising repeating the process using additional measured phase differences if the confidence value is less than a threshold confidence value.

14. The computer program product of claim 7, wherein the process is performed as a multi-threaded process comprising a first thread to perform the process to geolocate a first emitter and a second thread to perform the process to geolocate a second emitter.

15. A method for emitter geolocation, the method comprising:

measuring, by a processor-based system, phase differences between radar signals received at one or more pairs of antennas;

calculating, by the processor-based system, a first plurality of hypothesized phase differences based on ray tracings from hypothesized emitter locations at each of a first set of grid points to the one or more pairs of antennas;

generating, by the processor-based system, a first plurality of scores based on correlations between the measured phase differences and the first plurality of hypothesized phase differences;

generating, by the processor-based system, an error ellipse based on candidate grid points of the first set of grid points, the candidate grid points of the first set of grid points associated with a subset of the first plurality of scores, the subset including scores greater than a threshold percentage of a highest score of the first plurality of scores;

calculating, by the processor-based system, a second plurality of hypothesized phase differences based on ray tracings from hypothesized emitter locations at each of a second set of grid points to the one or more pairs of antennas, the second set of grid points bounded by the error ellipse;

generating, by the processor-based system, a second plurality of scores based on correlations between the measured phase differences and the second plurality of hypothesized phase differences; and selecting, by the processor-based system, one of the second set of grid points, that is associated with a highest of the second plurality of scores, as the estimated emitter geolocation.

16. The method of claim 15, wherein the first set of grid points is bounded by a search area, the search area based on an estimated angle and range to the emitter as provided by a radar warning receiver.

17. The method of claim 15, wherein spacing between the grid points of the first set of grid points is selected so that a difference in path length between the ray tracings associated with adjacent grid points is less than one wavelength of the radar signal.

18. The method of claim 15, wherein spacing between the grid points of the second set of grid points is less than spacing between the grid points of the first set of grid points.

19. The method of claim 15, wherein generating the error ellipse further comprises calculating a covariance matrix based on coordinates of the candidate grid points of the first set of grid points.

20. The method of claim 19, wherein the covariance matrix is a first covariance matrix and the threshold percentage is a first threshold percentage, and the process further comprises:

generating a second covariance matrix based on coordinates of candidate grid points of the second set of grid points, the candidate grid points of the second set of grid points associated with a subset of the second plurality of scores, the subset including scores greater than a second threshold percentage of a highest score of the second plurality of scores;

generating a confidence value based on a size of the second covariance matrix; and repeating the method using additional measured phase differences if the confidence value is less than a threshold confidence value.

* * * * *